US011003465B2

(12) United States Patent
Hiremath et al.

(10) Patent No.: US 11,003,465 B2
(45) Date of Patent: May 11, 2021

(54) METHOD TO CREATE A DECLARATIVE MODEL THAT DYNAMICALLY DRIVES BOTH A UI AND THE BACK-END RUNTIME WITH A ONE TO ONE CORRESPONDENCE

(71) Applicant: International Business Machines Corporation, Armonk, NY (US)

(72) Inventors: Jay Hiremath, Menlo Park, CA (US); Jean-Claude Mamou, Millbury, MA (US); Wendi L. Nusbickel, Boca Raton, FL (US); Peter Hagelund, Princeton Jct, NJ (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 15/440,914

(22) Filed: Feb. 23, 2017

(65) Prior Publication Data

US 2018/0239497 A1    Aug. 23, 2018

(51) Int. Cl.
*G06F 9/451*    (2018.01)
*G06F 8/38*     (2018.01)

(52) U.S. Cl.
CPC ............... *G06F 9/451* (2018.02); *G06F 8/38* (2013.01)

(58) Field of Classification Search
CPC ..................................... G06F 9/44; G06F 8/35
See application file for complete search history.

(56) References Cited

U.S. PATENT DOCUMENTS

| 5,448,740 | A | 9/1995 | Kiri et al. | |
|---|---|---|---|---|
| 6,738,077 | B1 | 5/2004 | Wendker et al. | |
| 6,772,409 | B1 | 8/2004 | Chawla et al. | |
| 7,020,660 | B2 * | 3/2006 | Woodring | G06F 8/30 717/122 |
| 7,818,676 | B2 * | 10/2010 | Baker | G06F 16/958 715/744 |
| 7,877,725 | B2 * | 1/2011 | Vitanov | G06F 8/35 709/201 |
| 7,941,438 | B2 * | 5/2011 | Molina-Moreno | G06F 8/35 707/756 |
| 8,214,324 | B2 | 7/2012 | Joerg et al. | |
| 8,386,947 | B2 | 2/2013 | Fusaro et al. | |
| 8,479,158 | B2 | 7/2013 | Chen et al. | |

(Continued)

*Primary Examiner* — Alvin H Tan
(74) *Attorney, Agent, or Firm* — North Shore Patents, P.C.; Michele Liu Baillie

(57) ABSTRACT

A system executes an operation in a back end system by creating a declarative language definition of the operation for execution of the operation. The declarative language definition defines at least one input required to execute the operation, and comprises user interface template information for a user interface template that accepts at least one input. The system dynamically generates a user interface panel from the declarative language definition. The user interface panel is generated from the user interface template, and comprises at least one input field. The system receives from a user through the user interface panel the input and an invocation of the operation, and executes the operation using the declarative language definition of the operation and the input received via the user interface panel. The system maintains synchronization between the back end system and a user interface by performing modifications of the operation within the declarative language definition.

9 Claims, 14 Drawing Sheets

(56) References Cited

U.S. PATENT DOCUMENTS

| | | | |
|---|---|---|---|
| 8,843,836 B2* | 9/2014 | Driesner | G06Q 10/06 |
| | | | 715/762 |
| 10,148,524 B2* | 12/2018 | Diester | G06F 3/0482 |
| 10,656,971 B2* | 5/2020 | Poon | G06F 9/54 |
| 2002/0101448 A1 | 8/2002 | Sanderson | |
| 2008/0320401 A1 | 12/2008 | Padmashree et al. | |
| 2011/0010613 A1* | 1/2011 | Shenfield | G06F 8/36 |
| | | | 715/234 |
| 2015/0310131 A1 | 10/2015 | Greystoke et al. | |
| 2016/0357526 A1* | 12/2016 | Soffer | G06F 8/36 |

* cited by examiner

CAPABILITIES.JSON OVERVIEW
{}
> "version" : {}
> "operationsConfig" : [96]
> "groups" : {}
> "operations" : [86]
> "udfs" : [105]

FIG. 2

EXAMPLE OF OPERATION GROUPING FROM CAPABILITIES.JSON FOR "CONCAT" OPERATION

```
"groups":
{
    ...
    "text":
    {
        "name": "Text",
        "groups":
        {
            "trimming",
            "case",
            "string",
            "escape",
            "quote"
        },
        "selectionMode": "multiple"
    },
    "string":
    {
        "name": "String functions",
        "ops":
        {
            "concat",
            "padstring",
            "rightstr",
            "leftstr",
            "replace",
            "convert",
            "substring"
        },
        "selectionMode": "multiple"
    }
    ...
}
```

FIG. 3

```
{
    "name": "concat",
    "template" : {
        "description" : "Concatenate $(CONCATSTRING) to string in columns $(COLUMN_NAMES)",
        "op" : "fn:concat",
        "version" : "3.1",
        "columnNames":
        {
            "$(COLUMN_NAMES)"
        },
        "concatString" : "$(CONCATSTRING)", "inputDatasets": {},
        "outputDatasets": {}, "argumentBindings" :
        {
            {
                "argument"
                {
                    "name": "COLUMN_NAMES",
                    "value":
                    {
                        "$(COLUMN_NAMES)"
                    }
                }
            },
            {
                "argument" {
                    "name" : "CONCATSTRING",
                    "value" : "$(CONCATSTRING)"
                }
            }
        }
    },
    "metadata" : {
        "label" : "Concatenate string",
        "context" : "multi-column",
        "targetTypeChanged" : false,
        "sourceTypeRestriction" :
        {
            "char",
            "varchar",
            "longvarchar",
            "wchar",
            "wvarchar",
            "wlongvarchar"
        }, "targetTypeRestriction" :
        {
            "char",
            "varchar",
            "longvarchar",
            "wchar",
            "wvarchar",
            "wlongvarchar"
        }, "arguments" :
        {
            {
                "name": "COLUMN_NAMES",
                "label": "Column Names",
                "description": "Name of columns on which operation is performed",
                "type": "arraystring",
                "quoted": false
            }, {
                "name": "CONCATSTRING"
```

FIG. 4

"CONCAT" TEMPLATE FILLED OUT BY UI AND SENT TO SERVER - WITH VALUES "Country" AND "abc" INSERTED.

FIG. 6

```
{
    "name": "abs",
    "template" : {
        "description" : "Absolute value of a number in column ${COLUMN_NAME}.",
        "op" : "ibm/abs",
        "version" : "3.0",
        "columnName" : "${COLUMN_NAME}", "inputDatasets": [],
        "outputDatasets": [], "argumentBindings" :
        [{
            "argument" : {
                "name" : "COLUMN_NAME",
                "value" : "${COLUMN_NAME}"
            }
        }
        ]
    }, "metadata" : {
        "context" : "column",
        "targetTypeChanged" : true,
        "label" : "Absolute number value",
        "sourceTypeRestriction" :
        [
            "decimal",
            "smallint",
            "integer",
            "real",
            "float",
            "double",
            "tinyint",
            "bigint",
            "numeric"
        ], "targetTypeRestriction" :
        [
            "decimal",
            "smallint",
            "integer",
            "real",
            "float",
            "double",
            "tinyint",
            "bigint",
            "numeric"
        ], "arguments" :
        [{
            "name" : "COLUMN_NAME",
            "label" : "Column Name",
            "description" : "Name of column on which operation is performed",
```

FIG. 8A

```
                        "type" : "string",
                        "quoted" : false
                }
            ]
        },
        "codeGen" : {
            "transformerClassName" : "com.ibm.is.drs.spark.transformer.math.Abs",
            "parameters" : [{
                        "COLUMN_NAME" : "columnName"
                }]
        }
}
```

FIG. 8B

```json
{
    "name": "mergedataset",
    "template": {
        "description": "Merge master table with update tables ${UPDATE_DATASETS}.",
        "op": "ibm/merge-datasets",
        "version": "3.0",
        "inputDatasets": [],
        "outputDatasets": [],
        "mergeKeys": ["${MERGE_KEYS}"],
        "argumentBindings": [
            {
                "argument": {
                    "name": "KEEP_UNMATCHED_MASTER_RECORD",
                    "value": "${KEEP_UNMATCHED_MASTER_RECORD}"
                }
            },
            {
                "argument" : {
                    "name" : "MASTER_DATASET",
                    "value" : "${MASTER_DATASET}"
                }
            },
            {
                "argument" : {
                    "name" : "UPDATE_DATASETS",
                    "value" : [
                        "${UPDATE_DATASETS}"
                    ]
                }
            },
            {
                "argument" : {
                    "name" : "MERGED_DATASET",
                    "value" : "${MERGED_DATASET}"
                }
            },
            {
                "argument" : {
                    "name" : "REJECT_DATASETS",
                    "value" : [
                        "${REJECT_DATASETS}"
                    ]
                }
            },
            {
                "argument" : {
                    "name" : "mergeKeys",
                    "value" : [
                        "${MERGE_KEYS}"
                    ]
                }
            }
```

FIG. 9A

```
        },
        "metadata": {
            "label": "Merge",
            "context": "multi-dataset",
            "arguments": [
                {
                    "name": "MASTER_DATASET",
                    "label": "Master data set",
                    "description" : "Master data set", "type": "inputDataset",
                    "role": "primaryInput",
                    "cardinality": "1:1",
                    "uiHints": {
                        "hide": true
                    }
                },
                {
                    "name": "UPDATE_DATASETS",
                    "label": "Available tables to merge",
                    "description" : "Update tables",
                    "type": "inputDataset",
                    "role": "update",
                    "cardinality": "1:n",
                    "uiHints": {
                        "shaper" : {
                            "removeOnApply" : true,
                            "annotations"    : ["forShapingOnly"]}, "displayOrder" : 2
                        },
                        "selector": {
                            "type": "datasetSelector",
                            "constraints":
["multipleDatasetSelector"], "nodata" : "No tables contain the
selected columns"
                        },
                        "events" : [
                            {
                                "action"   : "receive",
                                "eventName": "value-restriction-
change"
                            }
                        ]
                    }
                },
                {
                    "name": "MERGED_DATASET",
                    "label": "Merged table",
                    "description" : "Merged table",
                    "type": "outputDataset",
                    "role": "primaryOutput",
```

FIG. 9B

```
"cardinality": "1:1",
                "uiHints": {
                    "hide": true
                }
            },
            {
                "name": "REJECT_DATASETS",
                "label": "Reject tables",
                "description" : "Reject tables",
                "type": "outputDataset",
                "role": "reject",
                "cardinality": "0:n",
                "uiHints": {
                    "hide": true,
                    "skipConditions": [{
                        "argument":
"KEEP_UNMATCHED_MASTER_RECORD",
                        "value"   : true
                    }]
                }
            },
            {
                "name": "MERGE_KEYS",
                "label": "Matching master columns",
                "description": "Columns used to match the update
tables with the master table.",
                "type": "array[JSONObject]",
                "uiHints": {
                    "objectType" : "columnWithCase",
                    "selector": {
                        "type": "datasetColumnSelector",
                        "constraints":
["multipleColumnSelector"]
                    },
                    "events" : [
                        {
                            "action"    : "send",
                            "condition": "value-changed",
                            "eventName": "value-restriction-
change",
                            "argumentName" :
"UPDATE_DATASETS"
                        }
                    ],
                    "shaper" : {
                        "displayOrder" : 1
                    }
                }
            },
            {
                "name": "KEEP_UNMATCHED_MASTER_RECORD",
                "label": "Keep unmatched master record",
```

FIG. 9C

```
"description": "Action for the merge output rows if they don't meet the
merge condition.",
                "type": "boolean",
                "quoted": false,
                "default": true,
                "valueRestriction": {
                    "oneOf": [
                        {
                            "name": "Keep unmatched master rows",
                            "value": true
                        },
                        {
                            "name": "Show rejected rows in new table",
                            "value": false
                        }
                    ]
                },
                "uiHints": {
                    "hide": true
                }
            }
        },
        "codeGen": {
            "transformerClassName":
"com.ibm.is.drs.spark.transformer.DWMerge",
            "parameters": {
                {
                    "INPUT_DATASETS": "inputDatasets"
                },
                {
                    "OUTPUT_DATASETS": "outputDatasets"
                },
                {
                    "KEEP_UNMATCHED_MASTER_RECORD":
"keepUnmatchedMasterRecord"
                },
                {
                    "MERGE_KEYS": "mergeKeys"
                }
            }
        }
    }
}
```

FIG. 9D

METHOD TO CREATE A DECLARATIVE MODEL THAT DYNAMICALLY DRIVES BOTH A UI AND THE BACK-END RUNTIME WITH A ONE TO ONE CORRESPONDENCE

BACKGROUND

A user interface (UI) program that works with a complex back end system is often unable to support all of the functionality available in the back end system. The back end system needs to continue to evolve and support new functions, as well as different runtime platforms. As the back end system functionality is enhanced, the user interface may continue to fall further behind the capabilities of the back end system. Therefore, it would be helpful to have a way to dynamically drive both the user interface and the back end system with a one to one correspondence.

SUMMARY

According to an embodiment of the present invention, in a method for executing an operation in a back end system, the method creates a declarative language definition of the operation for execution of the operation. The declarative language definition defines at least one input required to execute the operation, and the declarative language definition comprises user interface template information for a user interface template that accepts at least one input. The method dynamically generates a user interface panel from the declarative language definition, where the user interface panel is generated from the user interface template. The user interface panel comprises at least one input field for accepting at least one input. The method receives from a user, through the user interface panel, at least one input and for invocation of the operation, and executes the operation using the declarative language definition of the operation and the input received via the user interface panel. The method maintains synchronization between the operation in the back end system and a user interface that supports the operation by performing modifications of the operation within the declarative language definition. The method receives, at the back end system, from a user interface, a request for a plurality of capabilities of the back end system, and compiles, at the back end system, a plurality of declarative language definitions for a plurality of operations supported by the back end system, for transmission to the user interface. The method receives, by the user interface, from the back end system, the plurality of declarative language definitions for the plurality of operations. The user interface organizes the plurality of capabilities from the plurality of declarative language definitions for presentation on the user interface, where the plurality of declarative language definitions for the plurality of operations comprises organization presentation information for the user interface. The method receives, by the user interface, from the back end system, the plurality of declarative language definitions for the plurality of operations comprising context information indicating which of the plurality of capabilities are valid based on a user context.

In an example embodiment, when the method dynamically generates the user interface panel from the declarative language definition, the method renders at least one input field from metadata in the declarative language definition.

In an example embodiment, when the method receives from the user, through the user interface panel, at least one input and the invocation of the operation, the user interface determines, from the user interface template, that additional input is required to execute the operation. The method obtains the additional input based on a user context, and transmits at least one input and the additional input from a user interface to the back end system.

In an example embodiment, when the method executes the operation using the declarative language definition of the operation and the input received via the user interface panel, the method receives, by the back end system, from a user interface, a request to execute the operation and at least one input. The method obtains, from the declarative language definition, metadata to facilitate the execution of the operation. The method transmits, from the back end system, to the user interface, a result of the execution of the operation, and renders, by the user interface, the result of the execution of the operation. System and computer program products corresponding to the above-summarized methods are also described and claimed herein.

BRIEF DESCRIPTION OF THE DRAWINGS

FIG. 2 illustrates an example of a declarative language definition to advertise the capabilities of the back end system, according to embodiments disclosed herein.

FIG. 3 illustrates an example operation grouping from the declarative model for the "concat" operation, according to embodiments disclosed herein.

FIG. 4 illustrates an example entry for the "concat" operation in the declarative model, according to embodiments disclosed herein.

FIG. 6 illustrates an example operation templated filled out with input values for the "concat" operation, according to embodiments disclosed herein.

FIGS. 8A-8B illustrate an example of metadata in the declarative language definition that validates a data type, according to embodiments disclosed herein.

FIGS. 9A-9D illustrate an example of mapping various arguments in the declarative language definition for a "Merge-Datasets" operation, according to embodiments disclosed herein.

DETAILED DESCRIPTION

Figure 1:
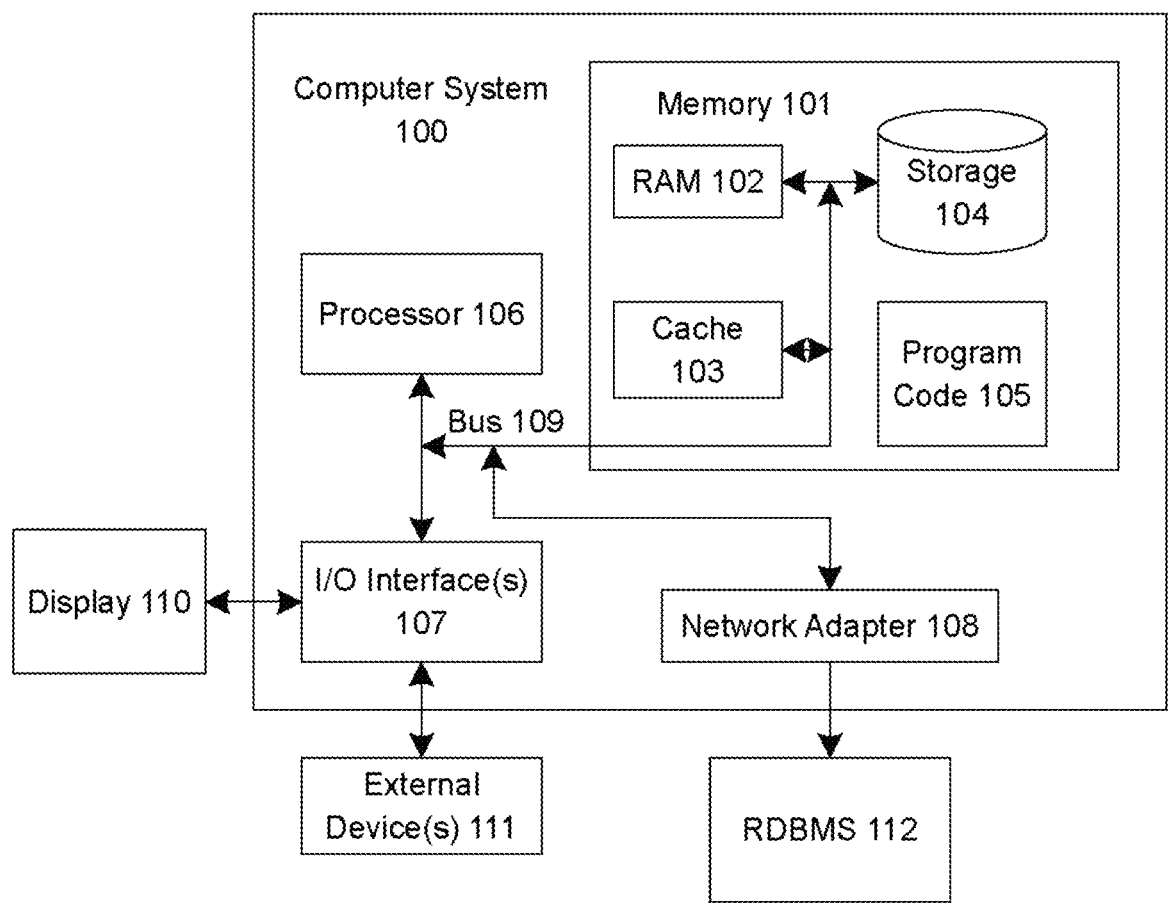
FIG. 1 illustrates an embodiment of a system for executing an operation in a back end system, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for executing an operation in a back end system according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiments of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

FIG. 2 illustrates an example of a declarative language definition to advertise the capabilities of the back end system. In this example embodiment, a developer creates a declarative language definition, for example, in JavaScript Object Notation (JSON). This file (or multiple files) that contains one or more declarative language definitions may be referred to as the declarative model. The declarative model defines each operation that is supported by the back end system, and includes a template for the user interface to fill out when sending the operation to the back end system for execution of the operation. The declarative model also comprises metadata that aids the user interface builder. Since the user interface artifacts are generated from the back-end system's declarative model, the user interface reflects the desired functionality of the back end system. As new features are added to the engine in the back end system, and the declarative model is updated accordingly, the user interface automatically provides access to those functions in the engine. In an example embodiment, the developer creates a declarative language definition for an operation with the arguments that are required for the operation. The user interface framework provides some of the arguments, and the user supplies the remaining arguments, if any arguments are required to execute the operation. The user interface framework obtains from the declarative model those arguments the user does not need to see (or provide) and those arguments that are special (such as displaying multiple columns on the screen for the user to select one of the columns). A declarative language definition template may contain a display order of the arguments to assist the developer when creating the declarative language definition for an operation. It should be noted that the terms declarative language definition, plurality of declarative language definitions, and declarative model may be used interchangeably.

Figure 10:
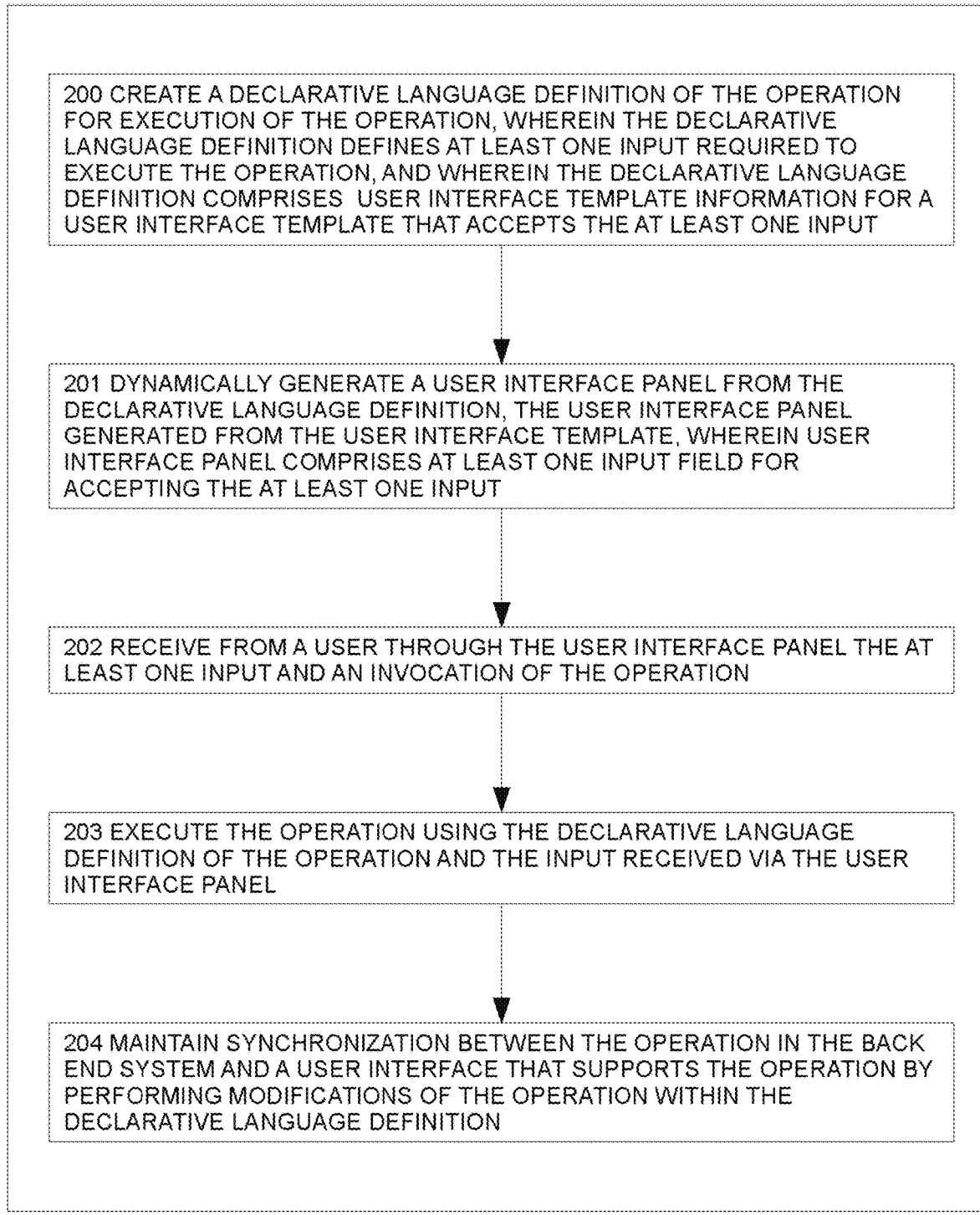
FIG. 10 is a flowchart illustrating an embodiment of a method for executing an operation in a back end system, according to embodiments disclosed herein.

FIG. 10 illustrates an embodiment of a method for executing an operation in a back end system. At 200, the method, via the processor 106, creates a declarative language definition of the operation for execution of the operation, where the declarative language definition defines at least one input required to execute the operation, and where the declarative language definition comprises user interface template information for a user interface template that accepts at least one input. In an example embodiment, a complex back end system may work in conjunction with a front end user interface, where the user interface provides a user with access to the functionality available in the back end (for example, operations that the back end executes). Typically, as a new functionality is added to the back end, a developer must code a user interface to access that new functionality, else a user will not be able to access the new functionality. A web user interface for a back end system in an Extract Transform Load (ETL) environment may be, for example, a Spark™ engine. Spark™ may potentially provide hundreds of transformation operations. Each of those transformation operations requires a developer to code a user interface screen or panel, in which a user would enter input and invoke the transformation operation. Otherwise, those transformation operations remain inaccessible to the user. Further, developing a user interface panel may take longer than adding an operation to the Spark™ engine, causing the user interface of the Spark™ engine to fall further and further behind the Spark™ engine's capabilities. Embodiments disclosed herein provide a method to dynamically grow the user interface to support the capabilities/functionalities (i.e., the operations) of the back end system by creating a declarative language definition of the operation that also comprises user interface template information for a user interface template that accepts inputs to the operation. In other words, the declarative language definition defines both the operation and the user interface panel (for a user to access that operation) that exposes the functionality of the back end system. The declarative language definition contains metadata to populate the user interface template. The declarative language definition is used by the back end system to expose and validate the available capabilities at runtime. The user interface and back end system are maintained in sync, both using the same declarative language and metadata to drive them. Thus, as new operations are added to the back end system, the user interface panels to access those operations are also implemented, allowing users to access the operations as they are added. The method dynamically grows the user interface (comprising one or more user interface panels) to support/match the capabilities of the back end system, and provides a way to quickly and automatically support the new functionality as new operations become available. A back end system may also support multiple consumption models such as, for example, Spark SQL, generated code in Scala, Python, and R. Embodiments disclosed herein also provide choices for runtime options for multiple runtime platforms and/or languages. The runtime "plug and play" facilitates swapping the back end system, but maintaining the same user experience in the user interface. The declarative language used in the declarative model offers the capability to describe the operation, configuration and plug/play engine runtime choices As the technology evolves, benefits of new features may be offered without impacting the user experience, and/or the functionality of operations available to the user.

At 201, the method dynamically generates a user interface panel from the declarative language definition. The user interface panel is generated from the user interface template, where the user interface panel comprises at least one input field for accepting at least one input. In an example embodiment, the user interface panel is the screen in which the user enter the inputs necessary to execute the operation, and may also be the screen from which the user invokes the operation. The user may enter no inputs, and the input field may be the invocation of the operation (for example, the "Submit" button on the user interface panel). In another example embodiment, the input(s) may be automatically provided by the user interface (for example, a user selects a column, then selects an operation, and the user interface provides the column name as input to the operation. In an example embodiment, the method publishes a declarative template for runtime operations capabilities using, for example, JavaScript Object Notation (JSON), eXtensible Markup Language (XML), or other formats suitable for a declarative language definition. The runtime capability (i.e., one or more operations) is expressed in a template format with place holders that represent user input in the user interface panel. Each place holder is a parameter of the operation, and when all parameters are substituted (including default parameters supplied by the user interface that renders the user interface panel on the screen), the declarative language definition forms a complete input for runtime execution of the operation. Parameters themselves are further described to capture parameter type, default value, constraints and to display hints. The runtime capability is further annotated to make it easy for search capabilities. Each capability has a unique ID and this is used to coordinate the publishing and invocation aspect of the capabilities. When a fully formed declarative language definition (i.e., the complete input for runtime execution of the operation) is supplied, the runtime configuration for that operation is looked up by ID, and the execution of that operation is delegated to an implementation. This method of configuration allows for multiple implementations for the same operation, for example, in multiple different programming languages.

Figure 5:
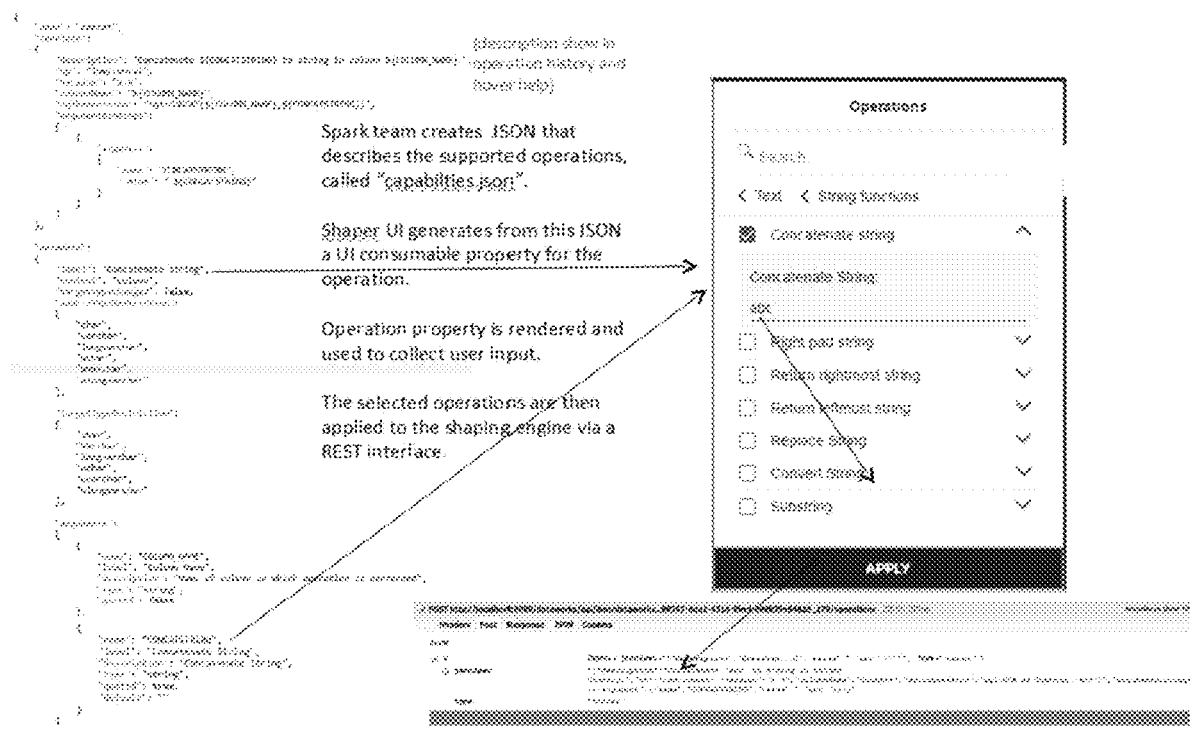
FIG. 5 illustrates an example high level view of code in the declarative model for the "concat" operation, and the user interface panel that is generated from the declarative model, according to embodiments disclosed herein.
Figure 7:
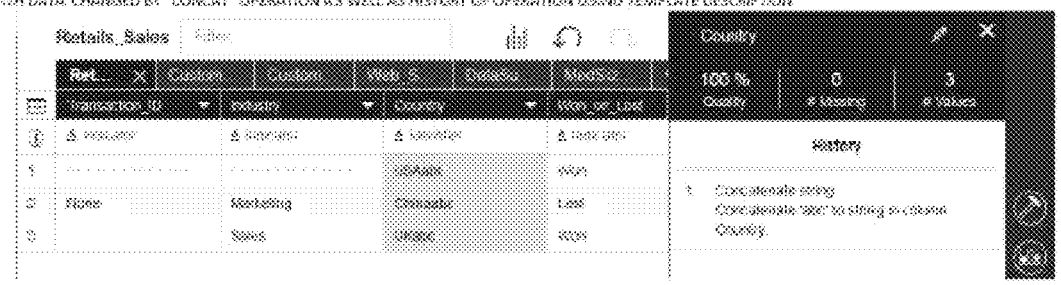
FIG. 7 illustrates an example of the user interface with data modified by the "concat" operation, according to embodiments disclosed herein.

At 202, the method receives from a user, through the user interface panel, at least one input, and an invocation of the operation. For example, the user interface (for example a web browser client) loads a plurality of declarative language definitions for a plurality of operations supported by the back end system. The plurality of declarative language definitions may also be referred to as the declarative model. The user interface loads the declarative model by fetching it from the server interface to the back end system, or engine. Within the user interface, the user may select data, such as a database table, and may open a panel of available operations. The user may select an available operation, such as the "concat" operation which is used to append a string to a value (column). Using the user interface template, the method dynamically generates the user interface panel for "concat" that includes user interface elements that match the input arguments for "concat". The user interface panel may also include the option to invoke or execute the "concat" operation. Using the declarative model, the user interface generates a list of operations, organized in a logical grouping, only showing the operations that are valid for the context of the user's data. FIG. 3 illustrates an example operation grouping from the declarative model for the "concat" operation. FIG. 4 illustrates an example entry for the "concat" operation in the declarative model. FIG. 5 illustrates an example high level view of code in the declarative model for the "concat" operation, and the user interface panel that is generated from the declarative model. FIG. 6 illustrates an example operation template filled out with input values for the "concat" operation. The user chooses an operation, such as "concat", and using the information from the declarative model, the user interface generates the user interface elements (i.e., the user interface panel) on the screen that match the arguments of the operation. The user enters the information for the operation's arguments in the user interface panel (e.g. CONCATSTRING value of "abc"). When the user applies the operation, the user interface inserts the argument values and/or default values that the user entered into the user interface panel, and sends that fully formed instance document to the server in an add operation request (e.g. HTTP POST). The back end system receives the request, processes it, and returns back the result of the data with the operation applied (e.g. "concat"). The user then views the updated data on the screen. FIG. 7 illustrates an example of the user interface with data modified by the "concat" operation. The "concat" operation was applied to data in a database to concatenate the string "abc" to data records in the "Country" column of the "Retails_Sales" table in the database. In an example embodiment, an operation may be applied to sample data, such as a subset of a dataset. The operation may also be applied to the data at a later point in time. In another example embodiment, the user interface panel comprises the operation name. In this example, no input from the user is required, and therefore, the user interface panel does not have any input fields that would be supplied by a user.

At 203, the method executes the operation using the declarative language definition of the operation, and the input received via the user interface panel. In an example embodiment, when the user executes the operation, the method inserts the input arguments (entered by the user), and/or default values into the user interface panel (i.e., template), and sends the operation to the back end system for execution. In response, the back end system receives the request, processes it, and returns the result of the operation. The user then sees the updated result of the operation on the screen. As noted above, FIG. 5 illustrates an example high level view of code in the declarative model for the "concat" operation, and the user interface panel that is generated from the declarative model. FIG. 6 illustrates an example operation templated filled out with input values for the "concat" operation. FIG. 7 illustrates an example of the user interface with data modified by the "concat" operation.

At 204, the method maintains synchronization between the operation in the back end system and a user interface that supports the operation by performing modifications of the operation within the declarative language definition. The declarative language definition dynamically drives both the user interface panel and the operation with a one to one correspondence, exposing the functionality available in the back end system. In an example embodiment, the user interface renders the user interface panel(s) that are dynamically created using the same metadata contained within the declarative model for each operation that is defined by a declarative language definition. In other words, each operation and the associated user interface panel (that exposes the operation to the user interface) use the same metadata contained within the declarative language definition.

In an example embodiment, the method receives, at the back end system, from the user interface, a request for a plurality of capabilities of the back end system. In response, the back end system compiles a plurality of declarative language definitions for a plurality of operations supported by the back end system, for transmission to the user interface. The user interface, used to access the back end system, receives from the back end system, the plurality of declarative language definitions for the plurality of operations, when the user interface loads. In other words, the user interface asks the back end system what operations are available. The back end system compiles all the declarative language definitions for the operations, and transmits those declarative language definitions back to the user interface. The plurality of declarative language definitions may be contained in one file, or may be contained in multiple files. The plurality of declarative language definitions are used to drive the user interface to show the user what functions are available in the back end system, and to allow the user to interact with the back end system through the user interface panels generated using the metadata in the plurality of declarative language definitions. The plurality of declarative language definitions and the user interface are dynamic, so as operations are added to the plurality of declarative language definitions, the user interface can immediately make them available to the user. Additionally, this dynamic implementation allows evolution of the runtime platform to take advantage of newer features, and also to offer additional choices.

In an example embodiment, the user interface receives the plurality of declarative language definitions for the plurality of operations, and organizes the plurality of capabilities from the plurality of declarative language definitions for presentation on the user interface. The plurality of declarative language definitions for the plurality of operations comprises organization presentation information for the user interface. In other words, the metadata in the plurality of declarative language definitions also contains organization information that informs the user interface how to organize the plurality of capabilities on the screen, for the user.

In an example embodiment, the user interface receives from the back end system the plurality of declarative language definitions for the plurality of operations comprising context information indicating which of the plurality of capabilities are valid based on a user context. In other words, the metadata in the plurality of declarative language definitions contains information that the user interface uses to generate a list of operations, organized in a logical grouping that only shows the operations that are valid for the context of the user's data.

In an example embodiment, when the method dynamically generates the user interface panel from the declarative language definition, the method renders at least one input field from metadata in the declarative language definition. Using the metadata contained in the plurality of declarative language definitions, the user interface generates the user interface panel elements on the screen that match the input arguments for the operation. Using the metadata, the user interface builds the panel arguments for example, a string, numeric slider, check box, etc. Using the metadata, the user interface knows how to render the panel elements. For example, the metadata contains information such as the range for a slider control (i.e., 1 to 100). If the panel element is "true/false", then the metadata informs the user interface to render that panel element as a check box. In effect, the metadata in the declarative language definition informs the user interface the optimal way to render the user interface panel elements for the operation. The metadata also contains hints for the user interface. For example, if one of the user interface panel arguments requires selection of a column in a database table, the declarative language definition contains a hint for the user interface to render the columns from the database table within on the screen. The hints are available to any developer who, for example, implements an operation that requires a column selection as an argument to that operation. The declarative language definition also provides the user interface within information associated with additional context needed for an argument for the operation. The declarative language definition also provides an additional level of complexity if there is something special about the argument to the operation.

In an example embodiment, when the method receives from the user through the user interface panel at least one input and the invocation of the operation, the user interface determines, from the user interface template, that additional input is required to execute the operation, and obtains the additional input based on a user context. The method then transmits at least one input and the additional input from a user interface to the back end system. In other words, the user enters input arguments into the user interface panel. When the user applies or invokes the operation, the user interface inserts the argument values that the user inputted, and also adds any default values. The default values may be values that the user interface can determine without input from the user. In an example embodiment, the user interface panel only requests input from the user that the user interface cannot determine automatically. The user interface then sends the fully formed instance document to the server in an add operation request, for example, HTTP POST.

In an example embodiment, when the method executes the operation using the declarative language definition of the operation and the input received via the user interface panel, the back end system receives from the user interface a request to execute the operation and any of the inputs required to execute the operation. The back end system obtains, from the declarative language definition, metadata to facilitate the execution of the operation. The back end system utilizes the metadata in the declarative language definition to know what arguments to expect, and what types of arguments to expect. The back end system may use the metadata to validate data types. The back end system, therefore, is more metadata driven, and the back end system uses the metadata as an aid to process the data. The back end system then transmits the result of the execution of the operation back to the user interface and the user interface renders the result of the operation on the screen for the user to view. FIGS. 8A-8B illustrate an example of metadata in the declarative language definition that validates a data type where an absolute value function is restricted to numeric types. The runtime engine on the back end system has access to the declarative language definition. This enables the runtime engine to perform certain validations using the metadata that is in the declarative language definition. For example, if an operation is declared to have a data type constraint in the declarative language definition, the runtime engine will validate the column that the operation is being applied to is indeed of the type constrained. FIGS. 9A-9D illustrate an example of mapping various arguments in the declarative language definition for a "Merge-Datasets" operation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of executing an operation in a back end system, the method comprising:
creating a plurality of declarative language definitions of a plurality of operations available for execution at the back end system on data in a database, the plurality of declarative language definitions defining the plurality of operations and comprising interface template information for a plurality of user interface templates corresponding to the plurality of operations,
wherein each given declarative language definition of the plurality of declarative language definitions defines a given operation of the plurality of operations and at least one argument required to be inputted by a user invoking the given operation, the at least one given argument required to execute the given operation on the data in the database,
wherein each given declarative language definition of the plurality of declarative language definitions further comprises given interface template information for a given user interface template of the plurality of user interface templates corresponding to the given operation, the given user interface template comprising information for at least one input field for accepting an input of the at least one argument from the user;

during runtime:
receiving, by the back end system, a request from a web browser client for the plurality of operations available for execution at the back end system on the data in the database;
compiling, by the back end system and in response to the request, the plurality of declarative language definitions for the plurality of operations;
sending, by the back end system, the plurality of declarative language definitions to the web browser client;
in response to receiving the plurality of declarative language definitions, presenting on a user interface, by the web browser client, the plurality of operations according to the plurality of declarative language definitions;
receiving, by the web browser client, a user selection of a given data in the database and the given operation;
in response to receiving the user selection of the given operation, generating, by the web browser client, a given user interface panel for the given operation using the given user interface template comprised in the given declarative language definition, wherein the given user interface panel comprises the at least one input field for accepting the at least one argument to be input by the user;
receiving, by the web browser client through the given user interface panel, the at least one argument input by the user and an invocation of the given operation to be executed on the given data in the database;
inserting, by the web browser, the at least one argument input by the user into the given declarative language definition;
sending, by the web browser client, the given declarative language definition comprising the inserted at least one argument and the invocation of the given operation to the back end system; and
in response to receiving the given declarative language definition comprising the inserted at least one argument and the invocation of the given operation, executing, by the back end system, the given operation on the given data in the database using the given declarative language definition of the given operation comprising the inserted at least one argument.

2. The method of claim 1 further comprising:
maintaining synchronization between the given operation in the back end system and the given user interface panel by performing modifications of the given operation within the given declarative language definition.

3. The method of claim 1 wherein executing the given operation on the given data in the database using the given declarative language definition of the given operation comprising the inserted at least one argument comprises:
obtaining, from the given declarative language definition, metadata to facilitate the execution of the given operation on the given data in the database using the at least one argument;
transmitting, from the back end system, to the web browser client, a result of the execution of the given operation on the given data in the database; and
rendering, by the web browser client, the result of the execution of the given operation on the given data in the database.

4. A computer program product for executing an operation in a back end system, the computer program product comprising:
a computer readable storage medium having computer readable program code embodied therewith, the program code executable by a computer processor to:
create a plurality of declarative language definitions of a plurality of operations available for execution at the back end system on data in a database, the plurality of declarative language definitions defining the plurality of operations and comprising interface template information for a plurality of user interface templates corresponding to the plurality of operations,
wherein each given declarative language definition of the plurality of declarative language definitions defines a given operation of the plurality of operations and at least one argument required to be inputted by a user invoking the given operation, the at least one given argument required to execute the given operation on the data in the database,
wherein each given declarative language definition of the plurality of declarative language definitions further comprises given interface template information for a given user interface template of the plurality of user interface templates corresponding to the given operation, the given user interface template comprising information for at least one input field for accepting an input of the at least one argument from the user;

during runtime:
receive, by the back end system, a request from a web browser client for the plurality of operations available for execution at the back end system on the data in the database;
compile, by the back end system and in response to the request, the plurality of declarative language definitions for the plurality of operations;
send, by the back end system, the plurality of declarative language definitions to the web browser client;
in response to receiving the plurality of declarative language definitions, present on a user interface, by the web browser client, the plurality of operations according to the plurality of declarative language definitions;
receive, by the web browser client, a user selection of a given data in the database and the given operation;
in response to receiving the user selection of the given operation, generate a given user interface panel for the given operation using the given user interface template comprised in the given declarative language definition, wherein the given user interface panel comprises the at least one input field for accepting the at least one argument to be input by the user;
receive, by the web browser client through the given user interface panel, the at least one argument input by the user and an invocation of the given operation to be executed on a given data in the database;
insert, by the web browser, the at least one argument input by the user into the given declarative language definition;
send, by the web browser client, the given declarative language definition comprising the inserted at least one argument and the invocation of the given operation to the back end system; and
in response to receiving the given declarative language definition comprising the inserted at least one argument and the invocation of the given operation, execute, by the back end system, the given operation to be executed on the given data in the database using the given declarative language definition comprising the inserted at least one argument.

5. The computer program product of claim 4 further configured to:
maintain synchronization between the given operation in the back end system and the given user interface panel by performing modifications of the given operation within the given declarative language definition.

6. The computer program product of claim 4 wherein the computer readable program code configured to execute the given operation on the given data in the database using the given declarative language definition of the given operation comprising the inserted at least one argument is further configured to:
obtain, from the given declarative language definition, metadata to facilitate the execution of the given operation on the given data in the database using the at least one argument;
transmit, from the back end system, to the web browser client, a result of the execution of the given operation on the given data in the database; and
render, by the web browser client, the result of the execution of the given operation on the given data in the database.

7. A system comprising:
a computing processor; and
a computer readable storage medium operationally coupled to the processor, the computer readable storage medium having computer readable program code embodied therewith to be executed by the computing processor, the computer readable program code configured to:
create a plurality of declarative language definitions of a plurality of operations available for execution at the back end system on data in a database, the plurality of declarative language definitions defining the plurality of operations and comprising interface template information for a plurality of user interface templates corresponding to the plurality of operations,
wherein each given declarative language definition of the plurality of declarative language definitions defines a given operation of the plurality of operations and at least one argument required to be inputted by a user invoking the given operation, the at least one given argument required to execute the given operation on the data in the database,
wherein each given declarative language definition of the plurality of declarative language definitions further comprises given interface template information for a given user interface template of the plurality of user interface templates corresponding to the given operation, the given user interface template comprising information for at least one input field for accepting an input of the at least one argument from the user;
during runtime:
receive, by the back end system, a request from a web browser client for the plurality of operations available for execution at the back end system on the data in the database;
compile, by the back end system and in response to the request, the plurality of declarative language definitions for the plurality of operations;
send, by the back end system, the plurality of declarative language definitions to the web browser client;
in response to receiving the plurality of declarative language definitions, present on a user interface, by the web browser client, the plurality of operations according to the plurality of declarative language definitions;
receive, by the web browser client, a user selection of a given data in the database and the given operation;
in response to receiving the user selection of the given operation, generate, by the web browser client, a given user interface panel for the given operation using the given user interface template comprised in the given declarative language definition, wherein the given user interface panel comprises the at least one input field for accepting the at least one argument to be input by the user;
receive, by the web browser client through the given user interface panel, the at least one argument input by the user and an invocation of the given operation to be executed on the given data in the database;
insert, by the web browser, the at least one argument input by the user into the given declarative language definition;
send, by the web browser client, the given declarative language definition comprising the inserted at least one argument and the invocation of the given operation to the back end system; and
in response to receiving the given declarative language definition comprising the inserted at least one argument and the invocation of the given operation, execute, by the back end system, the given operation on the given data in the database using the given declarative language definition of the given operation comprising the inserted the at least one argument.

8. The system of claim 7 further configured to:
maintain synchronization between the given operation in the back end system and the given user interface panel by performing modifications of the given operation within the given declarative language definition.

9. The system of claim 7 wherein the computer readable program code configured to execute the given operation on the given data in the database using the given declarative language definition of the given operation comprising the inserted at least one argument is further configured to:
obtain, from the given declarative language definition, metadata to facilitate the execution of the given operation on the given data in the database using the at least one argument;
transmit, from the back end system, to the web browser client, a result of the execution of the given operation on the given data in the database; and
render, by the web browser client, the result of the execution of the given operation on the given data in the database.

* * * * *